Feb. 27, 1951     B. HOFFMANN ET AL     2,543,021
DIRECTION FINDER
Filed Nov. 8, 1945

INVENTORS
BANESH HOFFMAN
MILTON SEMEL
BY
ATTORNEY

Patented Feb. 27, 1951

2,543,021

UNITED STATES PATENT OFFICE 2,543,021

DIRECTION FINDER

Banesh Hoffmann, Flushing, and Milton Semel, New York, N. Y., assignors to Federal Telephone and Radio Corporation, New York, N. Y., a corporation of Delaware Application November 8, 1945, Serial No. 627,488

7 Claims. (Cl. 343—114)

1

The present invention relates to direction finders and particularly to means for producing accurate indications therein.

Due to numerous causes, the indications produced by direction finders are often inaccurate. To compensate for this inaccuracy, use has been made of calibration charts but the use of such charts is inconvenient.

An object of the present invention is the provision of an improved direction finder providing direct readable, accurate directional indications.

Another object of the present invention is the provision of an improved direction finder having means for correcting any inaccuracies in the directional indications, which corrections are done in a continuously variable manner and correct not only for changes in the position or angle at which the indications appear on the screen of the indicating device of the direction finder, but also compensate for changes produced by changes in the frequency of the energy being received.

In accordance with a feature of our invention, we correct any inaccurate indication by selecting the voltages applied to the horizontally and vertically deflecting plates of a cathode ray oscillograph tube. These voltages, in accordance with our invention, are adapted to be continuously variable as the trace moves over the screen so as to correct for any errors at any position of the trace, and are also adapted to be variable to correct for variations produced by changes of frequency.

Another object of the present invention is the provision of means for producing a voltage wave or waves, which waves may be used for example, to correct errors in the indication of a direction finder, and which means are adjustable to produce different types of waves, which adjustment may be for example, synchronized with the tuning of a direction finding receiver.

Other and further objects of the present invention will become apparent and the invention will be best understood from the following description of an embodiment thereof, reference being had to the drawings, in which.

Figure 1:
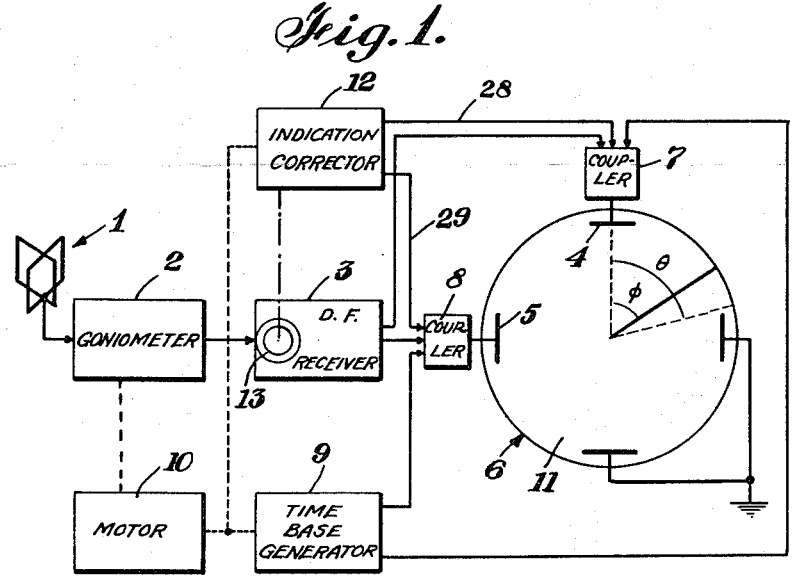
Fig. 1 is a block diagram of a direction finder embodying our invention.

Referring now to Fig. 1, the direction finder there illustrated may be generally conventional

2 and includes the usual direction finding antenna system 1, which may be, for example, of the crossed loop or Adcock type, a goniometer 2, feeding a direction finding receiver 3 whose output in turn is fed to the vertically deflecting plates 4 and horizontally deflecting plates 5 of a cathode ray oscillograph tube 6 through couplers 7 and 8 respectively. The sweep of the beam in tube 6 is controlled by a time base generator 9, which may also be connected to couplers 7 and 8 and thereby to the deflecting plates to produce a circular trace. The time base generator 9 is synchronized by means of a motor 10 with the rotation of the goniometer 2.

Assume that in a given instance the true azimuth angle of a target is $\phi$ and that the angle shown on the screen 11 of the cathode ray oscillograph tube would, in the absence of compensation or correction be $\theta$. In accordance with our invention, by selecting the two voltages applied to the horizontal and vertical plates of the cathode ray oscillograph tube 6, the position of the spot is shifted so that the true directional indication angle $\phi$ appears on screen 11. As the trace rotates, the amount of the correction varies as required to produce continuously true indications that is the complementary voltages available at corrector 12 are separately applied to the horizontal and vertical plates of the cathode ray oscillograph to mutually effect a corrective polar deflection in the case of a circular trace. This correction also varies in accordance with the frequency to which the direction finding receiver is tuned so that any changes produced by changes in frequency are also corrected. The correction is accomplished through the use of an indication corrector 12 which is driven by means of the motor 10 and thereby synchronized with the rotation of the goniometer and the time base of the tube 6, and is also controlled as indicated by the turning of the dial 13 of the direction finding receiver so as to compensate for changes due to changes in the tuning or frequency of the receiver.

Figure 2:
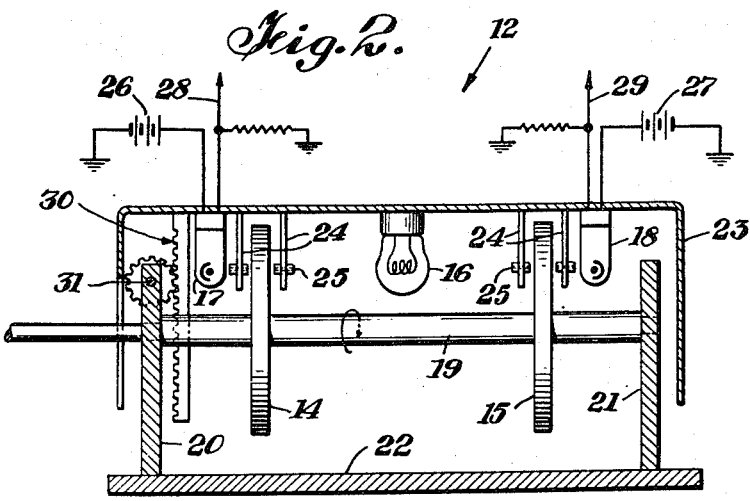
Fig. 2 is a schematic end view of the indication correction means in accordance with the present invention.

The indication corrector 12 controls the voltages applied to the vertically and horizontally deflecting plates of the cathode ray oscillograph tube 6. These voltages are in turn controlled by controlling the amount of light impressed upon photo-electric cells or photo tubes, thereby determining the amount of current passing through the photo tubes and the voltage applied to the deflecting plates of the cathode ray oscillograph tube. In the embodiment illustrated in Fig. 2 two disks 14 and 15 of varying opacity, are used to control the amount of light transmitted from a light source 16, which may be an incandescent lamp, to photo tubes 17 and 18 respectively. The disks 14 and 15 are mounted on a rotatable shaft 19 journaled in two uprights 20 and 21, which uprights are secured to a suitable base 22. The shaft 19 is connected to motor 10 (see Fig. 1).

The light source 16 is suspended from a vertically movable cover 23, with the photo tubes 17 and 18 likewise suspended and spaced on opposite sides thereof, with the disks 14 and 15 arranged between the photo tubes and the source 16. The light from source 16 goes through a very small area of the disks 14 and 15 before impinging upon photo tubes 17 and 18. For this purpose, a suitable optical system may be employed or use may be made of four collimating members 24 arranged on opposite sides of each of disks 14 and 15 and having suitable collimating slots 25 therein to direct the light from the source 16 through a selected narrow area of the disk onto the correct portion of the photo tubes. The collimating members 24 are likewise suspended from the movable cover 23. Disks 14 and 15, by controlling the amount of light impinging upon photo tubes 17 and 18 control the current flowing through said tubes from current sources 26 and 27 respectively and consequently control the voltage applied over lines 28 and 29 respectively to the vertically deflecting and horizontally deflecting plates of the cathode ray tube 6.

To compensate for inaccuracies at different positions or angles on the screen, or stated another way, at different positions of the circular trace, the disks 14 and 15 rotate synchronously with the trace and with the goniometer, and the portions of the disks passing the collimating slots 25 around a circumferential path vary in opacity to compensate for the different amounts of error at different positions of the trace on the screen. However, as stated hereinbefore, the amount of error also varies with variations in frequency. Consequently for different frequencies, different compensations are required for different angles on the screen or different positions of the circular trace. For this purpose, the entire cover 23 is arranged to be raised or lowered by any suitable means such as for example, a rack and spur arrangement 30 driven by a shaft 31 which shaft is in turn connected to the tuning dial 13 of the direction finding receiver. As the tuning dial 13 is turned and the frequency varied, the cover 23 is moved up and down so that the collimating slots 25 move radially in relationship to the disks, thereby bringing different portions of the disk into line with said slots depending upon the frequency being received.

Figure 3:
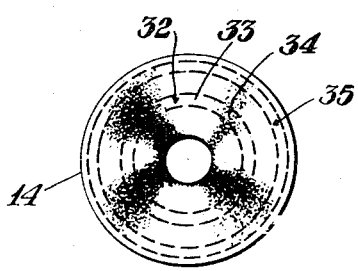
Fig. 3 is a plan view of one of the disks used in the apparatus of Fig. 2.

The foregoing may be better understood from an examination of Fig. 3 which represents one disk, as for example, disk 14. For a given frequency, light will pass through the collimating slots 25 along a given circumferential path such as for example, path 32 which includes the area within the dash lines. It will be seen that the opacity encountered by the light passing through slots 25 at this frequency will vary with different angular positions as the disk 14 rotates. For example, at the area indicated by the numeral 33, the disk will be almost entirely transparent, whereas the area indicated by the numeral 34 transmits considerably less light. This variation in opacity continues around path 32 and serves to compensate for different values of errors produced at different positions of the trace. When the frequency is changed, thereby requiring different values of correction, the collimating slots are moved to traverse another path such as for example, path 35 which includes the area within the dotted lines. It will be seen that the light transmission characteristics of path 35 differ from the light transmission characteristics of path 32 in value. Consequently a different output wave or train will be produced.

Disks 14 and 15 may be calibrated by any suitable means, such as for example, photographically. In the photographic calibration of these disks, use may be made of a calibrated light wedge to measure the required opacity at every given position on said disk and then the disk may be photographically printed as by exposing a photographic negative at small areas thereof to the proper amount of light and then affixing the properly calibrated negative to a transparent base. Various other means of photographically calibrating the disk may be employed.

While we have described the details of our invention in relation to one embodiment thereof, it will be apparent that numerous changes may be made in this embodiment without departing from the teachings of our invention. For example, while we have referred to one feature of our invention as being an indication corrector for a direction finder, it will be apparent that this device may be used wherever voltage wave trains are required which differ from each other (the particular wave train produced depending upon the particular circumferential path as scanned by the collimating slots 25). Accordingly, while we have described above the principles of our invention in connection with specific apparatus, it is to be clearly understood that this description is made only by way of example and not as a limitation on the scope of our invention as defined in the accompanying claims.

We claim:

1. In a direction finder in which variations in angular indication occur with frequency changes, means for producing a plurality of complementary waves for compensating said variations in angular indications comprising a light source, a plurality of photo-electric cells positioned to receive light from said source, a corresponding plurality of members each having a plurality of paths, each path having light transmission characteristics at successive points along said path in accordance with the degree of compensation required, the light transmission characteristics along each path being distinct from the light transmission characteristics along the other paths of each member, means for moving each member with respect to said source and its respective cell along one of said paths to produce a given wave, and adjustable means for selectively moving each member relative to said source and its respective cell along other of said paths to produce other distinctive waves.

2. A direction finder according to claim 1 wherein said direction finder includes a goniometer, and means for synchronizing rotation of said disks with the rotation of the goniometer.

3. A direction finder according to claim 2 wherein said finder includes tuning means, and means responsive to the operation of said tuning means for operating the adjusting means for changing the radial position of said source and tubes with respect to said disks.

4. An arrangement according to claim 3, further comprising a cathode ray oscillograph having deflection elements and a screen means for applying the output of said tubes and said goniometer to said deflection elements for controlling the cathode ray trace produced on the screen thereof.

5. A direction finder according to claim 4, wherein said plurality of disks and said plurality of tubes comprise two disks and two tubes respectively, means for applying the output of one tube to one set of deflection elements and means for applying the output of the other tube to another set of deflection elements whereby the position of the cathode ray trace on the screen controlled by said goniometer output is shifted on the screen so that a true directional trace indication appears thereon.

6. An arrangement according to claim 5, wherein one of the tube outputs is applied to the horizontal deflection elements and the other tube output is applied to the vertical deflection elements of the cathode ray oscillograph to provide compensation of the cathode ray trace indication on the screen in two right angle coordinates.

7. In a direction finder in which variations in angle indications occur with frequency changes, means for producing a plurality of complementary waves for compensating said variations in angular indications comprising a plurality of discs mounted for rotation and each provided with gradations in shading circumferentially around the disc, said shading gradations being different for different radial displacements, a light source and a corresponding plurality of photo-electric tubes positioned so that the light from said source passes through each disk at a given radial distance from the center thereof and impinges on its respective tube, means for rotating said disks to produce a wave in the output of their respective tubes variable in accordance with said gradations, and means for adjusting the radial position of said source and tubes with respect to their respective disks to vary the radial distance from the center of said disks at which light passes through the disks and impinges on the respective cells to provide variations in the output waves with changes in frequency.

BANESH HOFFMANN.
MILTON SEMEL.

REFERENCES CITED

The following references are of record in the file of this patent:

UNITED STATES PATENTS

| Number | Name | Date |
|---|---|---|
| 1,734,675 | Hull | Nov. 5, 1929 |
| 1,977,095 | Spielmann | Oct. 16, 1934 |
| 1,998,461 | Kucher | Apr. 23, 1935 |
| 2,210,410 | Johnske et al. | Aug. 6, 1940 |

FOREIGN PATENTS

| Number | Country | Date |
|---|---|---|
| 500,345 | Great Britain | Feb. 7, 1939 |